(12) United States Patent
Coxon et al.

(10) Patent No.: US 7,131,521 B2
(45) Date of Patent: Nov. 7, 2006

(54) SYNCHRONIZER

(75) Inventors: David J Coxon, Sale Manchester (GB); Graeme Andrew Jackson, Bolton (GB)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/772,481

(22) Filed: Feb. 5, 2004

(65) Prior Publication Data

US 2004/0154892 A1    Aug. 12, 2004

(30) Foreign Application Priority Data

Feb. 7, 2003  (GB)  ................................. 0302850.3

(51) Int. Cl.
*F16D 23/06*  (2006.01)
(52) U.S. Cl. .............................. 192/53.31; 192/53.341
(58) Field of Classification Search ............. 192/53.31, 192/53.34, 53.341; 74/339
See application file for complete search history.

(56) References Cited

U.S. PATENT DOCUMENTS

| 4,641,734 A | 2/1987 | Muller et al. |
| 5,425,437 A | 6/1995 | Nellums |
| 5,544,727 A * | 8/1996 | Braun ...................... 192/53.31 |
| 5,588,516 A * | 12/1996 | Braun et al. .................. 74/339 |
| 2003/0006116 A1* | 1/2003 | Jackson ................... 192/53.31 |

FOREIGN PATENT DOCUMENTS

| DE | 1 098 824 | 2/1961 |
| EP | 0 663 541 A1 | 7/1995 |

* cited by examiner

*Primary Examiner*—Rodney H. Bonck
(74) *Attorney, Agent, or Firm*—Paul S. Rulon

(57) ABSTRACT

A double acting synchronizer (18) includes cone clutch friction surfaces (24,40*a* and 26,42*a*) and jaw clutch teeth (28,38*b* and 30,38*c*) for frictionally synchronizing and positively connecting gears (14,16) to a shaft (12), and a plurality of integrated self-energizing/pre-energizing/blocker assemblies (44). The assemblies include pairs of self-energizing surfaces (54*a*,54*b* and 56*a*,56*b*) that respectively engage pairs of self-energizing surfaces (46*a*,46*b* and 48*a*,48*b*) to increase the engaging force of the cone clutches. The pairs of self-energizing surfaces are separated by non-self-energizing surfaces (54*e*,56*e* and 46*c*,48*c*) which engage to prevent unwanted engagement of the self-energizing surfaces when the synchronizer is in neutral. A detent mechanism resiliently positions the non-self-energizing surfaces for engagement when the synchronizer is in neutral.

6 Claims, 2 Drawing Sheets

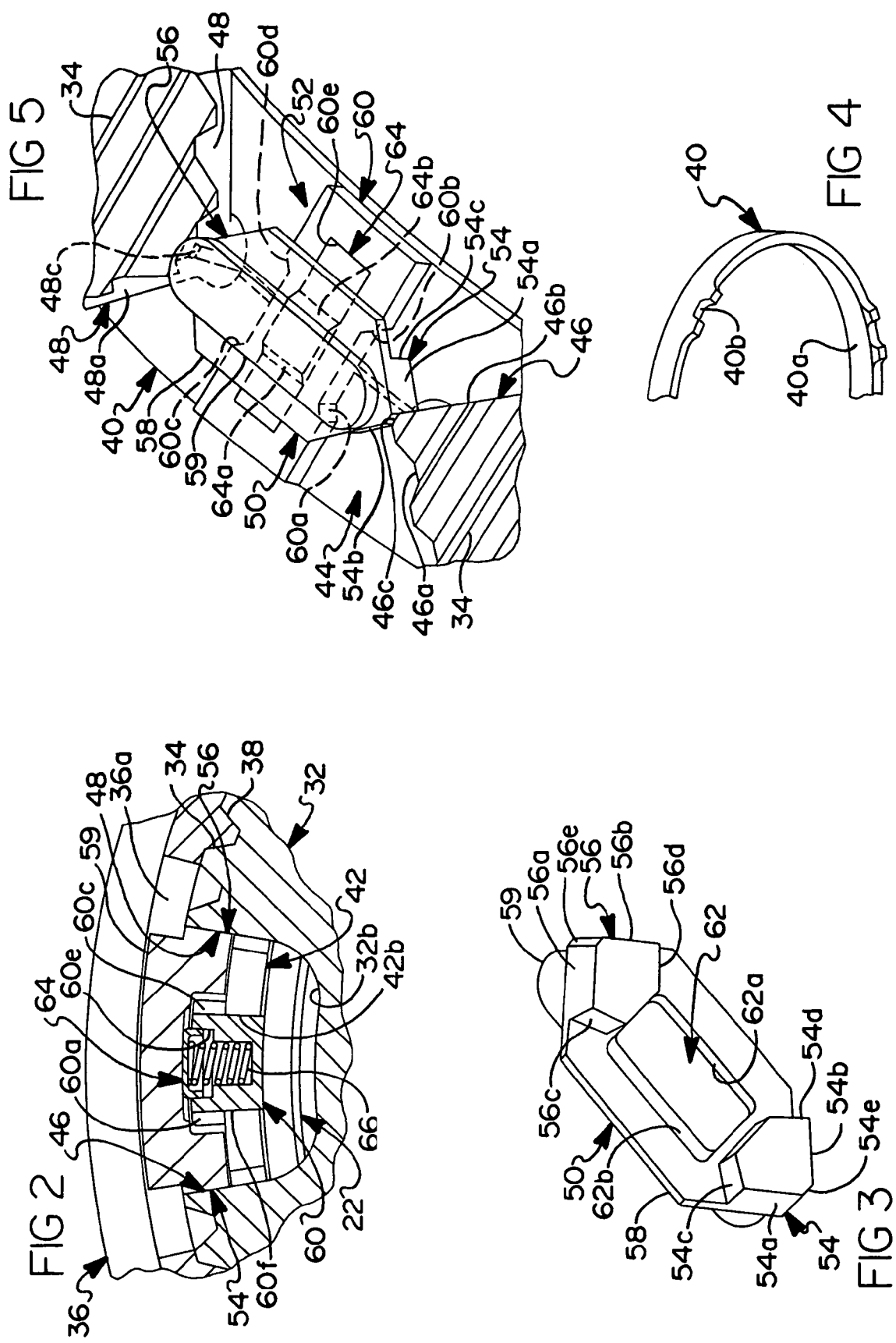

SYNCHRONIZER

FIELD OF THE INVENTION

This invention relates to a synchronizer with self-energizing.

BACKGROUND OF THE INVENTION

Synchronizers for use in multi-ratio transmissions are well known. Such synchronizers may be of the double acting type including pairs of friction and jaw members for respectively synchronizing and positive clutching gears to a shaft, synchronizer assemblies for engaging the friction members in response to initial engaging movement of a shift sleeve, a hub rotatably fixed to the shaft and having external spline teeth slidably receiving internal spline teeth of the shift sleeve which often defines one of the jaw member pairs, a baulking means having blocker teeth for arresting engaging movement of the shift sleeve until synchronization is reached and for transferring a shift force from the sleeve to increase the engaging force of the friction members.

It is also known that such synchronizers may be used to reduce shift time and shift effort required by a vehicle operator by the providing the synchronizers with self-energizing means. EP-A-0663 541 discloses a synchronizer having all of the above.

SUMMARY OF THE INVENTION

An object of this invention is to provide a synchronizer with an integrated self-energizing/pre-energizing mechanism and improved to prevent inadvertent self-energizing.

The invention relates to a synchronizer for connecting a first drive with either of axially spaced apart second and third drives disposed for relative rotation about an axis of the first drive and axially fixed relative thereto as disclosed in EP-A-0 663 541. The synchronizer includes a hub concentrically fixed to the first drive between the second and third drives and including external splines. First and second jaw teeth are respectively fixed to the second and third drives. A shift sleeve includes internal splines mating with the external splines and has third and fourth jaw teeth respectively engagable with the first and second jaw teeth in response to to-or-fro axial engaging movement of the sleeve from a neutral position by a shift force $F_o$. First and second friction surfaces are respectively fixed to the second and third drives and are engagable respectively with first and second friction rings axially disposed on opposite sides of the hub for producing a synchronizing torque when engaged. First and second blocker surfaces are operative when engaged respectively by third and fourth blocker surfaces to prevent engagement of the first and second jaw teeth respectively with the third and fourth jaw teeth prior to the synchronizing. Pre-energizing means are for engaging the first and second friction rings respectively with the first and second friction surfaces with an initial engaging force in response to initial to-or-fro engaging movement of the sleeve by the shift force ($F_o$) from the neutral position and for engaging the blocker surfaces in response to the synchronizing torque. First and second self-energizing surfaces fixed to the hub and separated by first non-self-energizing surfaces. Third and fourth self-energizing surfaces separated by second non-self-energizing surfaces. The first and second self-energizing surfaces are operative to react the synchronizing torque when engaged respectively with the third and fourth self-energizing surfaces for producing an additive axial force ($F_a$) in the direction of the shift force ($F_o$) and for increasing the engagement force of the first and second friction rings. The first and second non-self-energizing surfaces are operative when engaged to prevent engagement of the self-energizing surfaces. A member is mounted on the sleeve for non-radial and limited rotational movement relative thereto and having the third and fourth blocker surfaces and the third and fourth self-energizing surfaces fixed thereto and circumferentially interposed between the first and second blocker surfaces and the first and second self-energizing surfaces. The pre-energizing means includes first and second ramps biased by resilient means to a position between axially spaced apart third and fourth ramps fixed to the member and ramps are respectively engagable in response to the initial to-or-fro engaging movement. And detent means resiliently reacting between the hub and sleeve for positioning the sleeve in the neutral position and the non-self-energizing surfaces for engagement the detent means including a recess affixed against movement relative to the shift sleeve.

BRIEF DESCRIPTION OF THE DRAWINGS

The synchronizer of the invention is shown in the accompanying drawings in which:

FIG. 2 is a sectional view of a portion of the synchronizer looking along line 2—2 in FIG. 1;

FIG. 3 is a perspective view of a component in FIGS. 1 and 2;

FIG. 4 is a reduced size, perspective view of a portion of a friction ring in the synchronizer; and FIG. 5 is a perspective view of a pre-energizing, self-energizing and blocker assembly of the synchronizer.

DETAILED DESCRIPTION OF THE DRAWINGS

Figure 1:
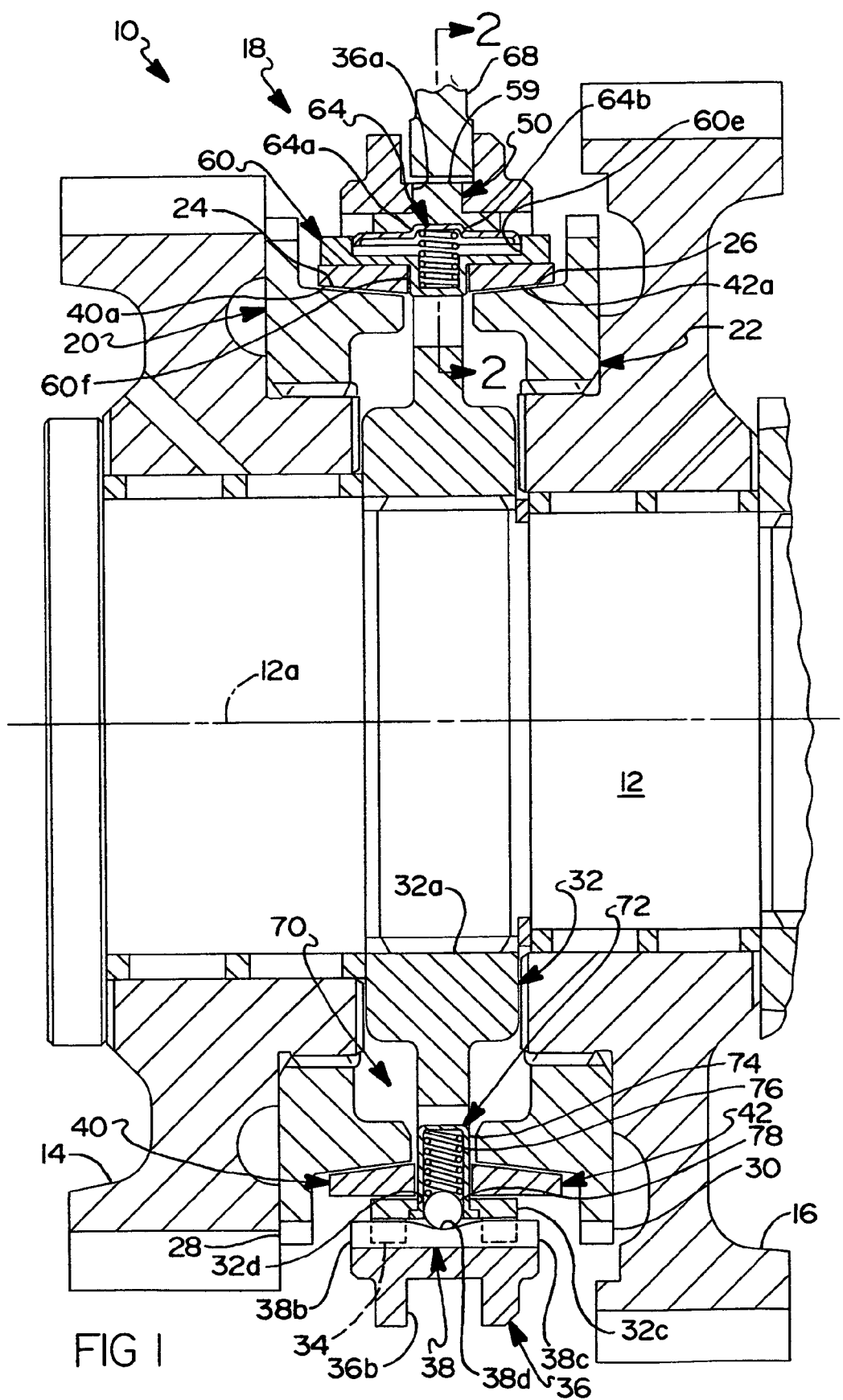
FIG. 1 is a sectional view of an upper half of a double-acting synchronizer in a neutral position and disposed for rotation about the axis of a shaft.

The term "synchronizer" shall designate a clutch mechanism utilized to non-rotatably couple selected ratio gears to a shaft or drive by means of positive clutches in which attempted engagement of the positive clutches is prevented until members of the positive clutches are brought to substantially synchronous rotation by synchronizing friction clutches associated with the positive clutches. The term "pre-energizer" shall designate mechanism for effecting initial engagement of the friction clutch in response to initial attempted engagement of the positive clutch. The term "self-energizing" shall designate mechanism to increase the engaging force of the synchronizing friction clutch in proportion to the synchronizing torque of the friction clutch.

Looking now at FIGS. 1–4, therein is shown a gear and synchronizer assembly 10 which forms part of a multi-ratio change speed transmission. Assembly 10 includes a shaft or drive 12 mounted for rotation about a central axis 12a, axially spaced apart gears or drives 14,16 supported on the shaft for rotation relative thereto and secured against axial movement relative to the shaft 12 in known manner, and a double-acting synchronizer 18 for coupling either gear to the shaft.

The synchronizer 18 includes annular members 20,22 axially and rotatably affixed to gears 14,16 in known manner, gear cone shaped friction surfaces 24,26 and gear jaw teeth 28,30 herein integral with members 20,22, a hub 32 axially and rotatably affixed at a central opening 32a thereof to shaft 12 and having external splines 34, a shift sleeve 36 having internal splines 38 in axial sliding mesh with the external splines 34 and friction rings 40,42. The synchronizer as disclosed herein further includes three circumferentially spaced apart and integrated self-energizing, pre-energizing and blocker assemblies 44 each disposed in a hub recess 32b having circumferentially spaced apart ends 46,48 defining self-energizing or boost ramp surfaces 46a, 46b and 48a, 48b. The external splines are formed on an outer circumference of an annular flange 32c of the hub. The self-energizing surfaces 46a, 46b and 48a, 48b are separated respectively by non-self-energizing surfaces 46c, 48c disposed parallel to the axis 12a of shaft 12. Each friction ring includes a cone friction surface 40a,42a and three circumferentially spaced apart recesses 40b,42b. Recesses 40b,42b react with portions of assemblies 44 to transmit operator shift force $F_o$, pre-energizing forces, and self-energizing forces $F_a$ to the friction surfaces.

Each assembly 44 includes a self-energizing member 50 which also functions as a combination pre-energizing and blocker assembly 52. Each member 50 includes circumferentially spaced apart end portions 54,56 rigidly secured together by a flange 58 having a circumferentially extending portion 59 received in a circumferentially extending slot 36a in shift sleeve 36. Slot 36a allows limited circumferential movement of member 50 relative to the shift sleeve and hub and prevents axial movement relative to the shift sleeve. End portions 54,56 respectively include self-energizing or boost ramp surfaces 54a,54b and 56a,56b that respectively react against the self-energizing ramp surfaces 46a,46b and 48a, 48b during self-energizing operation. The self-energizing surfaces 54a,54b and 56a,56b are separated respectively by non-self-energizing surfaces 54e,56e. Non-self-energizing surfaces 54e,56e are respectively positioned axially in alignment to engage non-self-energizing surfaces 46c,48c when the shift sleeve 36 is in the neutral positions of FIGS. 1, 2 and 5 for preventing unwanted activation of the self-energizing surfaces. End portions 54,56 also include blocker ramp surfaces 54c,54d and 56c,56d that react against blocker ramp surfaces 60a,60b and 60c,60d defined by a necked down portion of a force transferring strut like member 60 of assembly 52 during synchronizing and self-energizing operation. The radially inwardly facing side of flange portion 58 includes an elongated recess or detent 62 having angled pre-energizing ramps 62a,62b that react against pre-energizing ramps 64a,64b defined by a raised portion of an elongated ramp member 64 disposed in a mating recess 60e of member 60 and biased radially outward by a resilient means such as a coil spring 66. The radially inwardly facing side of member 60 includes a radially inwardly extending portion 60f having an internal recess receiving one end of spring 66 and a rectangular exterior received in the friction ring recesses 40b,42b. Recesses 40b,42b, which are open at their axially facing sides, allow axial movement of the strut member 60 relative to the friction rings 40,42. The pre-energizing ramps and spring 66 resiliently positions shift sleeve 36 in the neutral range position of FIGS. 1, 2 and 5 as established by a partially shown shift fork 68.

As is readily seen, friction surfaces 24,40a and 26,42a pair up to define friction clutches for synchronizing the gears to the shaft prior to engagement of the jaw clutch teeth. The friction surfaces may be defined by any of several known friction materials, e.g., pyrolytic carbon friction materials such as disclosed in U.S. Pat. Nos. 4,700,823; 4,844,218 and 4,778,548 may be used.

Spline teeth 34,38 have axially extending flank surfaces which continuously mate in close sliding relation so that there is relatively no rotational free play between shift sleeve 36 and shaft 12. Opposite ends of internal splines 38 define jaw teeth 38b,38c which respectively mate with gear teeth 28,30 to positive clutch the gears to the shaft. The flank sides of jaw teeth 38b,38c and of gear jaw teeth 28,30 may be provided with an anti-back out or a locking angle feature to prevent inadvertent disengagement of the teeth and with angled axially facing ends to assist engagement. These features may be seen by reference to U.S. Pat. No. 4,727,968.

Shift sleeve 36 is moved from the neutral position of FIGS. 1, 2 and 5 by an appropriate and unshown shift mechanism, such as disclosed in U.S. Pat. No. 4,920,815, which moves shift sleeve axially by the partially shown shift fork 68 disposed in an annular recess 36b in the shift sleeve. The shift mechanism may be manually moved or may be moved by means which automatically imitate shift mechanism movement and which also control the magnitude of the shift force applied by the shift mechanism. As may be seen in FIG. 1, the shift fork is received in recess 36b with axial looseness or free play. This free play and free play in the unshown shift mechanism establishes an axially neutral range of shift sleeve positions when the shift mechanism is in neutral. This neutral range, under some conditions, may allow enough axial movement for the non-self-energizing surfaces 54e,56e to be axially out of alignment with the non-self-energizing surfaces 46c,48c and thereby allow unwanted activation of the self-energizing surfaces as previously mentioned. For example, one such condition may occur due to wear of the friction surfaces, which surfaces when new help establish a restricted neutral range of the shift sleeve that keeps the non-self-energizing surfaces in axial alignment. Effects of the free play, independent of the condition the friction surfaces, is negated by providing the synchronizer with a detent mechanism 70 which establishes a fixed neutral position between the shift sleeve 36 and hub 32. Three detent assemblies may be used and spaced circumferentially between the assemblies 44. Each detent mechanism includes a spring capsule 72 having a cup shaped housing 74 snuggly received in a radially extending bore 32d in the hub and a spring 76 biasing a ball follower 78 radially outward into a detent 38d in a radially facing portion of an internal spline of the shift sleeve. Herein each bore 32d extends through the hub annular flange 32c and the bore is formed after removing a center portion of two adjacent hub external splines. When it is desired to couple either gear to the shaft the previously mentioned shift mechanism moves shift sleeve 36 axially via the partially shown shift fork 68 along the axis of shaft 12 either left to couple gear 14 or right to couple gear 16. When the shift mechanism is manually moved, the pre-energizer assemblies apply a pre-energizer force proportional to the force applied by the operator to the shift sleeve. Whether manually or automatically applied, the force is applied to the shift sleeve in an axial direction and is proportional to a shift force hereinafter referred to as an operator shift force $F_o$. The pre-energizer force, depending on direction of shift sleeve movement by the shift force $F_o$, moves either friction surface 40a or 42a into initial engagement with its associated friction surface to clock the strut member 60 to a position relative to hub 32 for positioning the self-energizing member 50 and the blocker ramp surfaces thereof for engagement with the blocker ramp surfaces of strut member 60 in a manner explained hereinafter.

The pre-energizing, blocking and self-energizing force paths and component engagements for synchronizing shaft 12 with gear 16 assumes an asynchronous condition exists in one direction between shaft 12 and gear 16. Asynchronous conditions in the other direction or for synchronizing gear 14 produce force paths and component engagements that should be obvious from the following description. Initial rightward axial engaging movement of shift sleeve 36 by the operator shift force is transmitted to friction ring 42 via a force path including shift sleeve 36, self-energizing members 50, pre-energizing ramps 62a,64a, spring biased members 64, strut members 60, and radially inwardly extending portions 60f of the strut members which contact circumferentially extending portions of recesses 42b. This initial engaging movement and force moves friction surface 42a into friction surface 26, thereby producing an initial synchronizing torque for rotating friction ring 42 and strut members 60 to positions ensuring contact of blocker ramp surfaces 60b with blocker ramp surface 54c. This initial axial movement of the shift sleeve also allows the torque from friction ring 42 to rotate strut member 60 and self-energizing member 50 counterclockwise relative to hub 32 for engaging self-energizing ramp surfaces 54b,46b via a force path that includes friction ring 42, strut members 60, self-energizing member end portions 54 and self-energizing ramp surfaces 54b,46b. This force path does not include the pre-energizing ramps and accordingly is independent of the pre-energizing forces.

When self-energizing ramp surfaces 54b,46b and blocker ramp surfaces 54c,60b are engaged and ignoring the effect of engaged self-energizing ramp surfaces 54b,46b, full operator shift force $F_O$ is applied to friction rind 42 via a force path that includes shift sleeve 36, self-energizing member blocker ramp surfaces 54c, and blocker ramp surfaces 60b and inwardly extending portions 60f of the strut member, thereby engaging friction surfaces 42a,26 with full operator shift force for producing a synchronizing torque proportional to the operator shift force $F_o$. Since blocker ramp surfaces 54c,60b are oblique to the plane of rotation they, in addition to preventing asynchronous engagement of jaw teeth 38b,30 and transmitting the shift force Fo to friction surfaces 42a,26, also produce a counter torque or unblocking torque counter to the synchronizing torque but of lesser magnitude during asynchronous conditions. When substantial synchronism is reached, the synchronizing torque drops below the unblocking torque, whereby the blocker ramp surfaces move out of engagement to allow continued axial movement of the shift sleeve and engagement of moveable jaw teeth 38c with gear jaw teeth 30.

Looking now at the affects of the self-energizing ramp surfaces, the synchronizing torque $T_0$, due to the operator applied axial shift force $F_0$, is, of course, reacted across the self-energizing ramp surfaces, which surfaces produce an axial force component or axial additive force $F_a$ acting in the same direction as operator shift force $F_0$. This additive force $F_a$ is also transmitted across the blocker ramp surfaces, thereby further increasing the engaging force of the friction surfaces to provide an additive synchronizing torque $T_a$ which adds to the torque $T_0$. The synchronizer may include means to limit the magnitude of the additive axial force $F_a$. One such means is shown in an as of yet unpublished European Patent Application 00 125 950.0.

A synchronizer with integrated pre-energizing, blocking and self-energizing assemblies, and with detent means are disclosed. The following claims are intended to cover inventive portions of the assemblies.

What is claimed is:

1. A synchronizer for connecting a first drive with either of axially spaced apart second and third drives disposed for relative rotation about an axis of the first drive and axially fixed relative thereto; the synchronizer including:
   a hub concentrically fixed to the first drive between the second and third drives and including external splines;
   first and second jaw teeth respectively fixed to the second and third drives;
   a shift sleeve including internal splines mating with the external splines and having third and fourth jaw teeth respectively engagable with the first and second jaw teeth in response to to-or-fro axial engaging movement of the sleeve from a neutral position by a shift force $(F)_o$;
   first and second friction surfaces respectively fixed to the second and third drives and engagable respectively with first and second friction rings axially disposed on opposite sides of the hub for producing a synchronizing torque when engaged;
   first and second blocker surfaces operative when engaged respectively by third and fourth blocker surfaces to prevent engagement of the first and second jaw teeth respectively with the third and fourth jaw teeth prior to the synchronizing;
   pre-energizing means for engaging the first and second friction rings respectively with the first and second friction surfaces with an initial engaging force in response to initial to-or-fro engaging movement of the sleeve by the shift force ($F_o$) from the neutral position and for engaging the blocker surfaces in response to the synchronizing torque;
   first and second self-energizing surfaces fixed to the hub and separated by first non-self-energizing surfaces and third and fourth self-energizing surfaces separated by second non-self-energizing surfaces, the first and second self-energizing surfaces operative to react the synchronizing torque when engaged respectively with the third and fourth self-energizing surfaces for producing an additive axial force ($F_a$) in the direction of the shift force ($F_o$) and for increasing the engagement force of the first and second friction rings, and the first and second non-self-energizing surfaces operative when engaged to prevent engagement of the self-energizing surfaces;
   a member mounted on the sleeve for non-radial and limited rotational movement relative thereto and including a first end having the third and fourth blocker surfaces and the third and fourth self-energizing surfaces fixed thereto and circumferentially interposed between the first and second blocker surfaces and the first and second self-energizing surfaces;
   the pre-energizing means including first and second ramps biased by resilient means to a position between axially spaced apart third and fourth ramps fixed to the member and respectively engagable in response to the initial to-or-fro engaging movement; and
   detent means resiliently reacting between the hub and sleeve for positioning the sleeve in the neutral position and the non-self-energizing surfaces for engagement, the detent means includes a recess affixed against movement relative to the shift sleeve.

2. The synchronizer of claim 1, wherein:
   the hub includes an annular flange defining the external splines and has a radially extending bore extending there through; and the detent means includes resilient means disposed in the bore and biasing a follower radially outward toward engagement with a detent in the sleeve.

3. The synchronizer of claim 2, wherein:

the detent is formed in a radially inward facing portion of one of the internal splines (38).

4. The synchronizer of claim 1, wherein each member includes a second end circumferentially spaced from the first end and rigidly secured thereto by a circumferentially extending portion including the third and fourth ramps, the second end including fifth and sixth blocker surfaces and fifth and sixth self-energizing surfaces circumferentially interposed between and respectively for engaging seventh and eight blocker surfaces and seventh and eight self-energizing surfaces for respectively preventing the engagements of the jaw teeth and for producing the additive axial force when the synchronizing torque is opposite the one direction.

5. The synchronizer of claim 4, wherein:

the hub includes an annular flange defining the external splines and has a radially extending bore extending there through; and the detent means includes resilient means disposed in the bore and biasing a follower radially outward toward engagement with a detent in the sleeve.

6. The synchronizer of claim 5, wherein:

the detent is formed in a radially inward facing portion of one of the internal splines (38).

* * * * *